Figure 1:
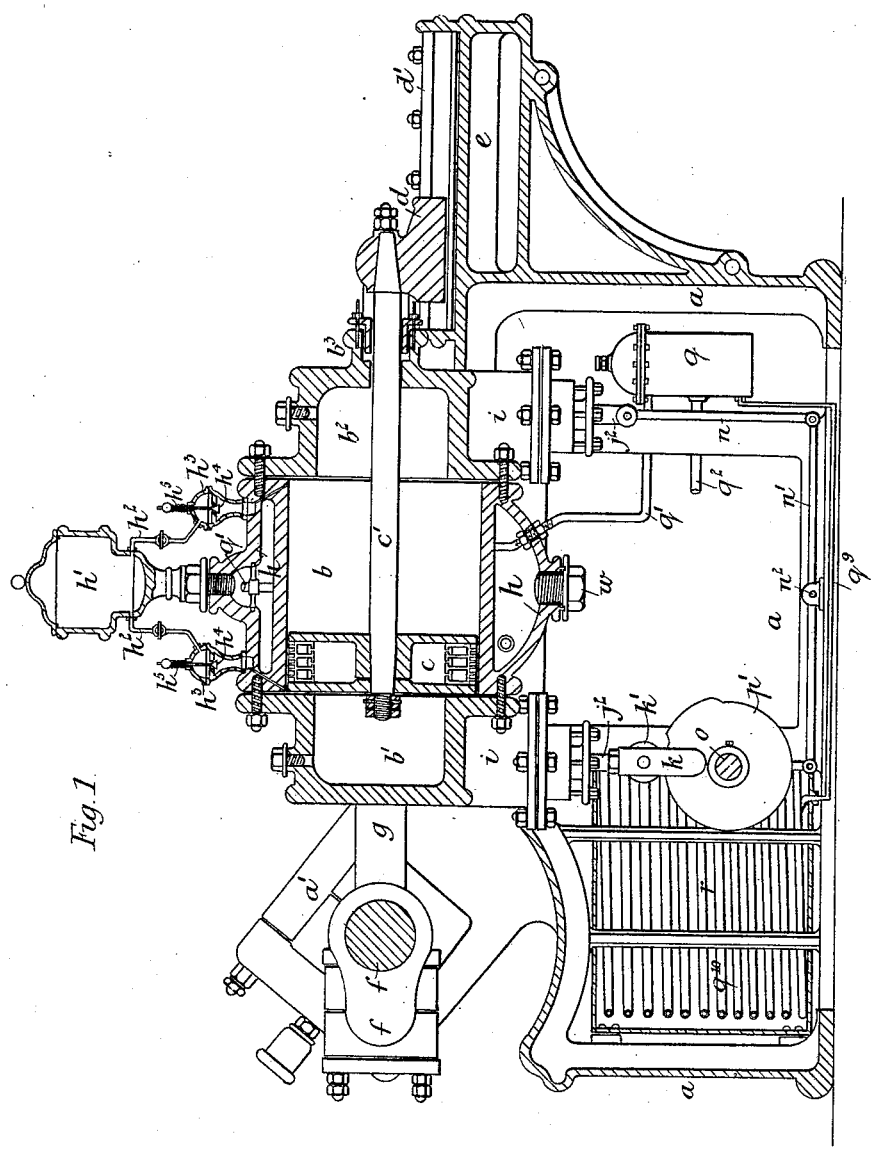

(No Model.) 4 Sheets—Sheet 1.

A. E. TAVERNIER.
ENGINE OR MOTOR OPERATED BY EXPLOSIVE MIXTURES.

No. 428,764. Patented May 27, 1890.

Witnesses. Inventor.

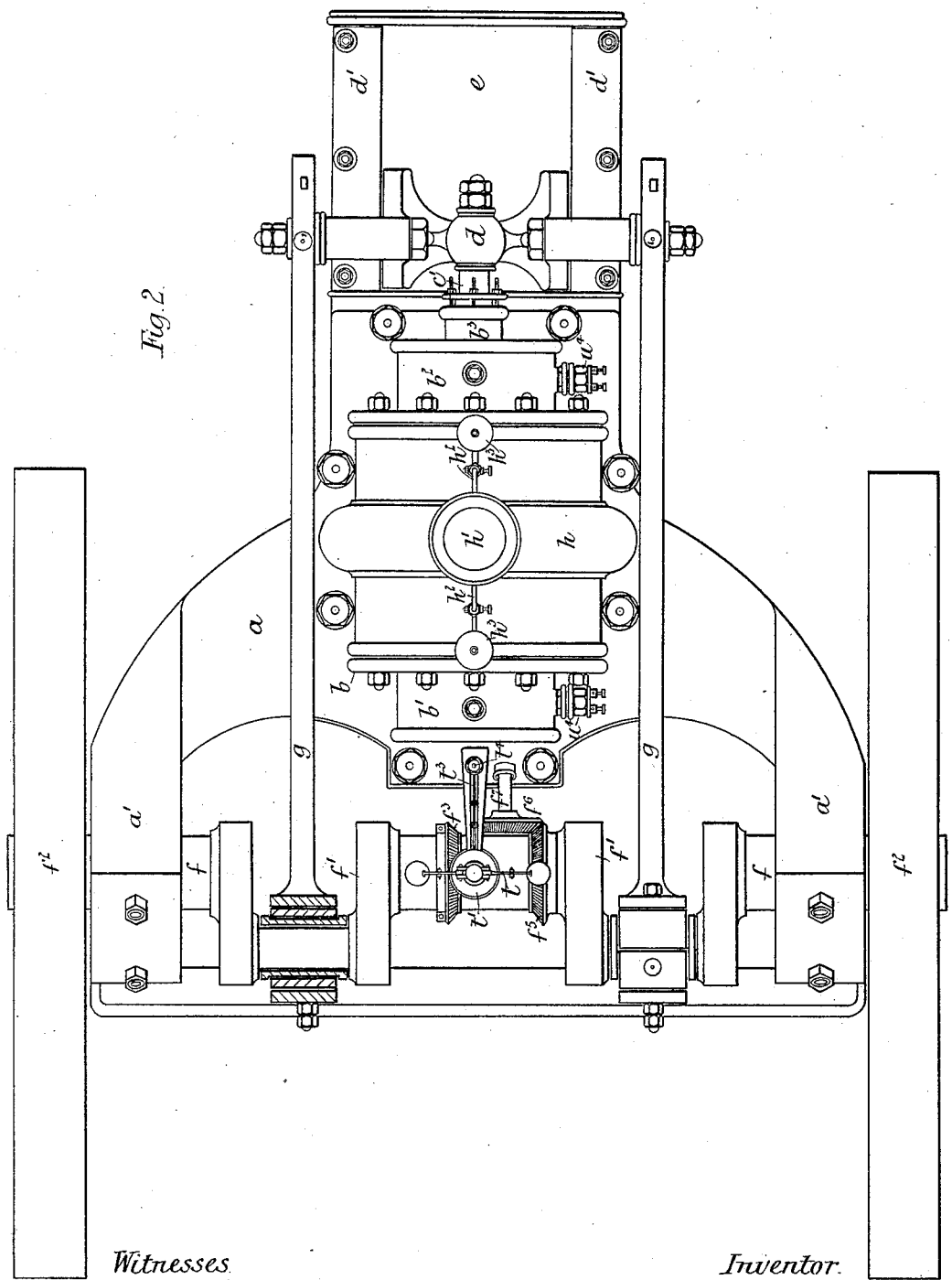

(No Model.) 4 Sheets—Sheet 3.
A. E. TAVERNIER.
ENGINE OR MOTOR OPERATED BY EXPLOSIVE MIXTURES.
No. 428,764. Patented May 27, 1890.
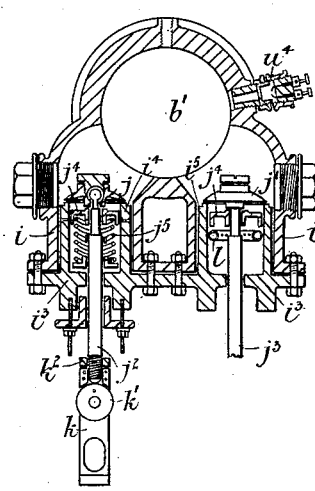
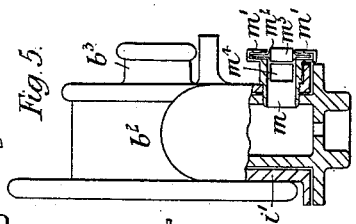
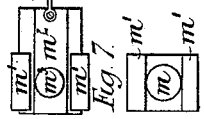
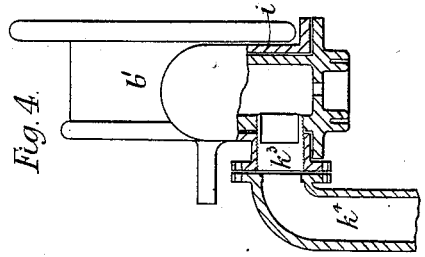
Witnesses. Inventor.

(No Model.) 4 Sheets—Sheet 4.
A. E. TAVERNIER.
ENGINE OR MOTOR OPERATED BY EXPLOSIVE MIXTURES.
No. 428,764. Patented May 27, 1890.
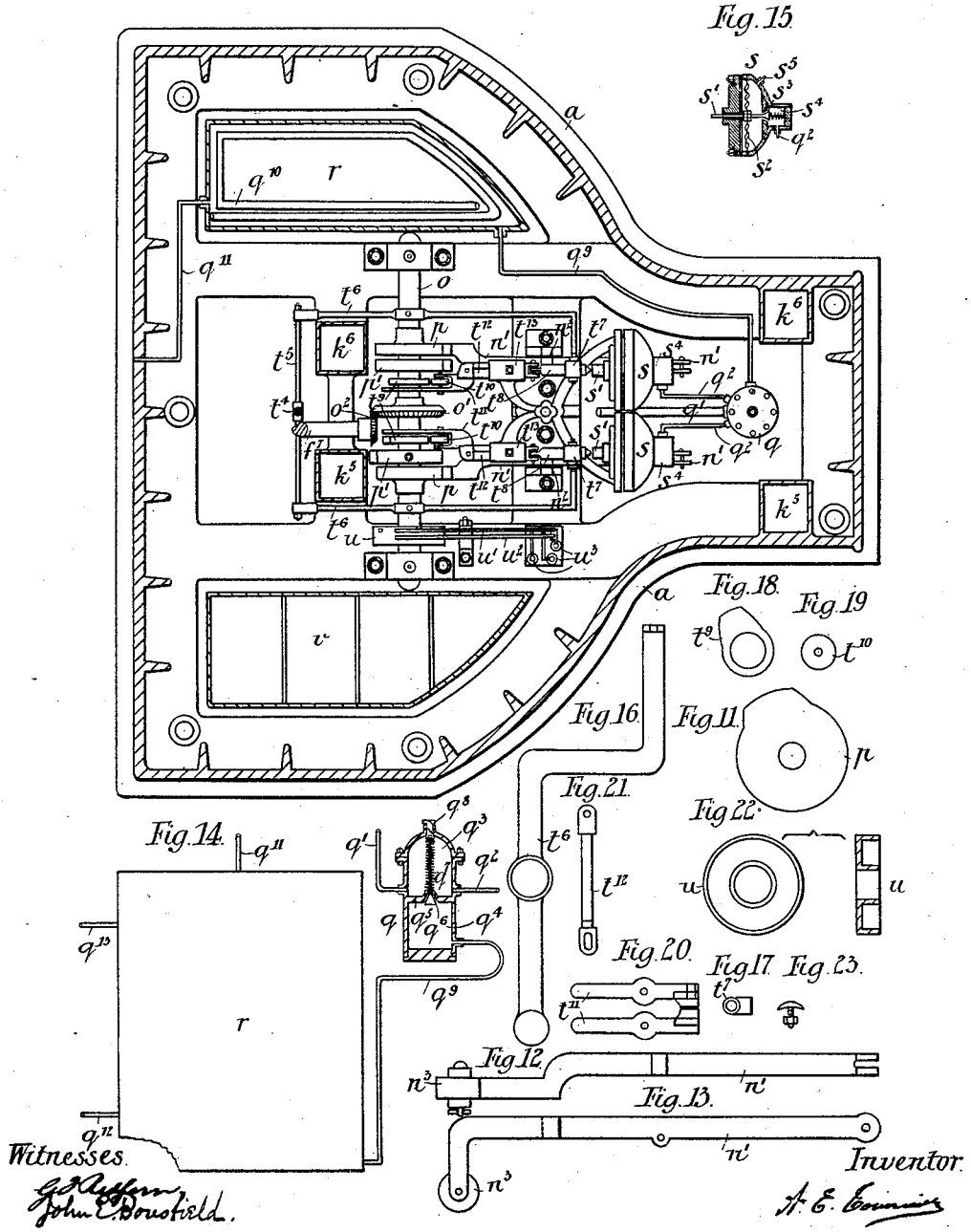

UNITED STATES PATENT OFFICE.

ALPHONSE EDOUARD TAVERNIER, OF LONDON, ENGLAND.

ENGINE OR MOTOR OPERATED BY EXPLOSIVE MIXTURES.

SPECIFICATION forming part of Letters Patent No. 428,764, dated May 27, 1890.

Application filed March 21, 1890. Serial No. 344,723. (No model.) Patented in England January 29, 1889, No. 1,603, and in France August 29, 1889, No. 200,482.

*To all whom it may concern:*

Be it known that I, ALPHONSE EDOUARD TAVERNIER, a citizen of the Republic of France, residing at London, England, have invented new and useful Improvements in Engines or Motors Operated by Explosive Mixtures, (for part of which I have obtained a patent in Great Britain, No. 1,603, dated January 29, 1889, and a patent in France, No. 200,482, dated August 29, 1889,) of which the following is a specification.

My invention relates to engines or motors to be worked by explosive mixtures of, say, hydrocarbon vapor and air, and has for its chief objects to provide means for preventing the interior of the cylinders of such engines from becoming coated with carbon, whereby I am enabled to employ crude petroleum for the formation of the explosive mixture and to obtain an effective cooling of the cylinder and piston with the least possible expenditure of water.

To enable my invention to be fully understood, I will proceed to describe the same by reference to the accompanying drawings, in which—

Figure 1 is a vertical section of my improved motor, and Fig. 2 is a plan. Figs. 3, 4, 5, 6, 7, 8, and 9 show details of certain parts of the motor. Fig. 10 is a horizontal section of the motor. Figs. 11 to 23 are views of other details.

$a$ is the frame or bed-plate, on which is fixed a cylinder $b$, having at its ends two explosion-chambers $b'$ $b^2$.

$c$ is the piston fixed to a rod $c'$, which passes through a stuffing-box $b^3$, and is fixed to a block or cross-head $d$, sliding in guides $d'$ $d'$ on the table $e$, projecting from the bed-plate $a$. On the said bed-plate are fixed or formed two plumber-blocks $a'$ $a'$, in which is mounted the crank-shaft $f$, which has the two cranks $f'$ $f'$, and to which are secured two fly-wheels $f^2$ $f^2$, a bevel-wheel $f^3$, which transmits motion to the governor, hereinafter described, and a second bevel-wheel $f^5$, which rotates the wheel $f^6$ and the inclined shaft $f^7$. The block or cross-head $d$ is connected to the cranks $f'$ $f'$ by two connecting-rods $g$ $g$.

The cylinder $b$ is surrounded by a jacket $h$, on which is fixed a lubricator $h'$, which by means of the tubes $h^2$ supplies the valve-boxes $h^3$ $h^3$ with oil drop by drop. Each of the boxes $h^3$ $h^3$ contains a valve $h^4$, which opens toward the interior of the cylinder $b$ and is held closed by a spring $h^5$.

Each explosion-chamber $b'$ $b^2$ has formed integral with it, as shown most clearly in Fig. 3, two small cylinders $i$ $i'$, in which are located valves $j$ $j'$. The cover $i^3$ of the cylinders $i$ $i'$ has formed upon it two small cylinders $i^4$ and $i^5$, which fit into the cylinders $i$ $i'$ and form seats for the valves $j$ $j'$. The valves $j$ serve for the exhaustion of the gases resulting from the combustion in the cylinder $b$, and the valves $j'$ serve for the admission of the vaporized petroleum and air for the explosive mixture. The said valves $j$ $j'$ are operated through the medium of rods $j^2$ $j^3$, passing through guides $j^4$ $j^4$ in their respective cylinders. Springs $j^5$ always tend to keep the valves $j$ closed, and stuffing-boxes surround their rods to insure tightness. Springs are also used to close the valves $j'$, but they are placed beneath the cylinders $i'$. To the rods $j^2 j^3$ in the chamber $b'$ are fixed stirrups $k$, which carry rollers $k'$, the raising of which by cams, as hereinafter described, causes the opening of the valves $j$ $j'$. One of the stirrups $k$, with the roller $k'$ therein, is shown in side and end view in Figs. 8 and 9, respectively. The extent to which each valve is opened can be regulated by means of a nut $k^2$ on the screw-threaded end of each of the rods $j^2$ $j^3$. A junction-pipe $k^3$ is formed upon each of the cylinders $i$ and adapted for the attachment of a pipe $k^4$, connected to passages $k^5$ in the bed-plate, through which passages the products of combustion can be exhausted, as shown most clearly in Figs. 4 and 10. Passages $k^6$ in the bed-plate $a$ serve for the passage of air to the cylinder, as hereinafter described.

Within each of the small cylinders $i^5$ is a tube $l$, bent to an annular form and pierced with small holes, as shown in the drawings, which annular tube is in connection with the apparatus which serves to supply petroleum to the motor.

Each of the cylinders $i'$ has attached to it a tube $m$, Figs. 5, 6, and 7, at the outer end of which are formed guides $m'$, in which is a slide $m^2$, having an opening $m^3$ formed therein, which opening by moving the slide can be regulated to control the supply of air passing therethrough. A small opening $m^4$ in the side of each tube $m$ communicates through a cock and tube (not shown in the drawings) with a carburetor, hereinafter described.

The stirrups $k$ and rollers $k'$ are only used with the cylinders $i\ i'$ of the explosion-chamber $b'$, as hereinbefore described. In the explosion-chamber $b^2$ the rods $j^2\ j^3$ are jointed to rods $n\ n$, which are actuated by levers $n'\ n'$, pivoted at $n^2\ n^2$. These levers $n'\ n'$, one of which is shown detached at Figs. 12 and 13, carry rollers $n^3\ n^3$, which rest against cams, hereinafter described, the said cams serving to open and close the valves $j$ and $j'$ in the chamber $b^2$ through the medium of the levers $n'\ n'$ and rods $n\ n$.

Inside the motor is a horizontal shaft $o$, turning in two plumber-blocks, Fig. 10, which shaft $o$ is driven by bevel-gearing $o'\ o^2$ from the inclined shaft $f^7$. The shaft $o$ carries two cams $p$, Figs. 10 and 11. The rollers $n^3\ n^3$ on the levers $n'\ n'$, Figs. 10, 12, and 13, are below the cams $p\ p$, whence it results that during the rotation of the said cams projections thereon act to depress the levers $n'\ n'$, whereby the valves $j\ j'$ of the cylinders $i\ i'$ of the chamber $b^2$ are opened. When these cam projections cease to act, the rollers $n^3\ n^3$ bear against the circular portion of the body of the said cams under the action of springs, thereby closing the valves $j\ j'$. The shaft $o$ also carries two cam-wheels $p'\ p'$, which are of the same shape as the cams $p\ p$. These two cams $p'\ p'$ act upon the rollers $k'\ k'$, carried in the stirrups $k\ k$, and effect the opening of the valves $j\ j'$ in the chamber $b'$. It will thus be seen that the cams on the shaft $o$ serve to control the valves of the motor.

The petroleum for forming the explosive mixture in my motor is supplied to the cylinder in a state of vapor. For this purpose the petroleum in the liquid state is fed by a pump into the jacket $h$ of the cylinder $b$, where, in consequence of the heat generated by the explosions, it is vaporized, the vapor being delivered by means of the annular tubes $l$, Fig. 3, into the small cylinders $i'\ i'$. The vapor generated in the jacket $h$ passes into a chamber $q$, Figs. 1 and 14, through the tube $q'$, Fig. 1, and thence a part of it through tubes $q^2\ q^2$ to valve-chambers hereinafter described, while the remainder, if any, passes to a condenser. The chamber $q$ is divided into two compartments $q^3\ q^4$, Fig. 14, by a partition $q^5$, in which is a valve $q^6$, acted upon by a spring $q^7$, the pressure of which is regulated by a nut $q^8$. This valve is so regulated that when the pressure in the upper compartment $q^3$ rises above a given point the said valve will open and allow the excess of vapor to pass into the lower compartment $q^4$, whence it passes through a tube $q^9$ to the coil or worm $q^{10}$ of the condenser $r$, whence the condensed petroleum passes through a tube $q^{11}$, Figs. 10 and 14, to the petroleum-supply tank. The box of the condenser is divided into two parts, each of which contains a portion of the spirals of the coil or worm $q^{10}$. One part of the said box has an opening communicating with the atmosphere, and is also in communication with the passages $k^6$, hereinbefore mentioned, which extend to the sockets $m$, provided with the slides $m^2$, whence it results that the air for the formation of the explosive mixture is drawn in through this part of the box, whereby it is caused to pass over the coils of the condenser therein, and is thereby heated. The other part of the said box contains water, which enters through the tube $q^{12}$ and passes off through the tube $q^{13}$.

The portion of the petroleum-vapor necessary for the explosive mixture is fed to two valve-chambers $s\ s$, Figs. 10 and 15, as hereinbefore mentioned, through the tubes $q^2\ q^2$. Each of these valve-chambers is constructed with a solid cover, through which passes a rod $s'$, fixed to a movable diaphragm $s^2$, and terminated by a valve $s^3$, which controls the communication between the chamber $s$ and an auxiliary chamber $s^4$. A spring in the auxiliary chamber $s^4$ serves to insure the closing of this valve $s^3$. With this construction, if the end of the rod $s'$ be pushed, it will, by reason of the elasticity of the diaphragm $s^2$, which is preferably composed of corrugated sheet-copper, open the valve $s^3$, and on the removal of the pressure the valve will be closed by the spring. The petroleum-vapor enters the auxiliary chamber of the valve-chamber $s$ through the pipe $q^2$, as hereinbefore stated, and leaves through the tube $s^5$, which communicates with the annular pipes $l$ in the cylinders $i'$.

The motor has a governor $t$, Fig. 2, operated by two bevel-wheels $f^3$ and $t'$. The balls in moving outward under the centrifugal action operate to raise one end of a lever $t^3$ and to depress the other end, which, acting on a rod $t^4$, causes it to descend. This rod is connected by a cross-bar $t^5$ with two levers $t^6\ t^6$, Figs. 10 and 16, having their fulcrums on the shaft $o$. These levers $t^6\ t^6$ at their free ends carry guide-sockets $t^7\ t^7$, Figs. 10 and 17, in which slide rods $t^8\ t^8$. These rods are caused to reciprocate in their guide-sockets $t^7\ t^7$ by the cam-wheels $t^9\ t^9$, Figs. 10 and 18, on the shaft $o$ acting on rollers $t^{10}$, Figs. 10 and 19, carried on the sliding pieces $t^{11}$, Figs. 10 and 20, connected by rods $t^{12}$, Figs. 10 and 21, with the slide-rods $t^8\ t^8$. The connecting-rods $t^{12}$ slide in sockets $t^{13}$. So long as the governor is running at a normal speed the position of the levers $t^6\ t^6$ will not be affected, so that the sockets $t^7\ t^7$ will support the slide-rods $t^8\ t^8$ in such a position that they will be caused to impinge against the rods $s'$ to open the valves and admit petroleum-vapor to the cylinders. If, however, the governor is running above a normal speed, the rod $t^4$ is lowered, so that the ends of the levers carrying the guide-sockets $t^7$ are raised, whereby the slide-rods $t^8$ $t^8$ are prevented from impinging against the rods $s'$, so that the supply of petroleum-vapor to the motor is prevented.

The ignition of the charges in the cylinder is effected by means of electricity, and to accomplish this I fix a wheel $u$, Figs. 10 and 22, having cam projections, Fig. 23, thereon for operating levers $u'$ $u^2$, Fig. 10, which close and open the contacts $u^3$ $u^3$, for completing and breaking the electric circuits of the two lighters $u^4$, fixed on the chests $b'$ $b^2$. These two ignitors $u^4$, Fig. 3, are each constructed of two platinum wires passing through an insulated body and communicating with the two poles of a source of electricity by means of the said contacts. They are inclosed in a small cylinder screwed on the explosion-chambers. The commutator or contacts may be of ordinary construction.

A carburetor $v$, Fig. 10, is arranged within the bed or frame of the engine and communicates by means of tubes with the openings $m^4$ $m^4$ of the cylinders $i'$ $i'$, Fig. 5. This carburetor, which is to contain volatile hydrocarbons, serves for starting and working the motor until the cylinder is sufficiently hot to vaporize the petroleum in the jacket $h$, after which the motor can be worked under normal conditions.

To start the motor the slides $m^2$ are closed and the passages $m^4$ are opened. The crank-shaft is then turned to draw in a charge of carbureted air from the carburetor and to compress this charge in, say, the chamber $b'$, the said charge being then ignited to drive the piston forward. During the compression in the chamber $b'$, however, a charge of carbureted air is drawn into the chamber $b^2$, and during the subsequent explosion of the first charge the piston compresses the second charge in the said chamber $b^2$. When the explosion of the second charge takes place, the valve $j$ of the chamber $b'$ being open, the gaseous products of the first combustion are driven out through its tube $k^4$. The momentum of the fly-wheels then moves the piston toward the chamber $b^2$, driving the products of combustion caused by the second explosion out through the other tube $k^4$, and at the same time drawing in a fresh charge of carbureted air into the chamber $b'$ and the cylinder $b$, which charge is compressed on the next stroke and the cycle of operations again repeated.

Before starting the motor care should be taken that the jacket $h$ contains a suitable quantity of petroleum for vaporization as soon as the heat is sufficient. When a pressure-gage placed on the machine indicates that the pressure in the jacket is sufficient, the passages $m^4$, Fig. 5, are closed and the slide $m^2$ is opened, as well as a cock, which places the valve-box $q$ in communication with the jacket.

Each time each valve $s^3$, Fig. 15, is opened during the operation of the motor, petroleum vapor issues through the small openings of the corresponding annular distributer $l$, Fig. 3. The position of the cams on the shaft $o$ must be so regulated that the various openings may be uncovered at the proper time—that is to say, when one of the valves $s^3$ is open the corresponding valve $j'$ must also be open, so that at the inward stroke of the piston air will enter through the opening $m^3$ and the cylinder will be supplied with an explosive mixture composed of petroleum vapor and air. This mixture, the proportions of which are regulated by suitable cocks, with which the petroleum-vapor pipes are provided, and by the position of the slides $m^2$, will be very intimate, the air being compelled to pass through the center of the distributer $l$ and to carry the vapor with it into the cylinder. This mixture is compressed on the return-stroke of the piston and ignited by one of the lighters $u^4$ by means of the electric contact. The products of combustion are then driven from the cylinder through one of the valves $j$ by the return of the piston, and afterward the cylinder is again supplied with the explosive mixture. Both chambers of the cylinder operate in the same way, but alternately—that is to say, the explosion takes place in one chamber while the other chamber is being supplied, and so on.

The cooling of the cylinder is effected by the vaporization of petroleum in the jacket, it being well known that to effect vaporization a certain number of units of heat are absorbed; but the vaporization of the quantity of petroleum necessary for the working of the engine is insufficient to effect this cooling, and in order to obtain a proper cooling I therefore inject into and vaporize in the jacket a larger quantity of liquid than is required for the explosive mixture. When the pressure increases sufficiently, owing to the rise of temperature, it overcomes the resistance of the valve $q^6$ in the valve-box $q$, Fig. 14, and opens the same. The excess of vapor then enters the compartment $q^4$ and passes into the worm $q^{10}$, traversing the two chambers of the box of the condenser $r$, whence it issues in a condensed state through the tube $q^{11}$ and is returned to the petroleum-reservoir of the motor.

By regulating the resistance of the spring $q^7$ by means of the nut $q^8$ it is obvious that the pressure in the jacket can be regulated, and consequently the temperature of the cylinder. The cooling of the coils of the condenser is effected in two ways. As hereinbefore stated, the box of the condenser is divided into two parts, one of which is in communication with the cylinder through the openings $m^2$, Fig. 5, so that during the inspiration-strokes of the motor air is caused to pass through the box and over the coil contained therein, which thereby is partly cooled. The other part of the condenser $r$ contains water, as hereinbefore stated, which is supplied by the tube $q^{12}$ and passes off through the tube $q^{13}$.

The petroleum is fed from the reservoir into the jacket $h$ to replace the quantity of petroleum vaporized by a pump worked by the engine.

The motor, as will be seen by reference to Fig. 2, has its connecting-rod connected with the piston-rod at the end of the cylinder most remote from the crank-shaft, in order that it may occupy as little space as possible. My invention is also characterized by the fact that the petroleum serves as the combustible part of the explosive mixture, and at the same time as the cooling agent for the cylinder. With my invention also the residues which usually result from the vaporization of petroleum are prevented from depositing in the cylinder in the form of carbon, as, the vaporization being effected in the jacket, the residues are deposited in it, and are removed from the cylinder from time to time by removing the stopper $w$. The mixture of the petroleum vapor with air gives a better and more intimate molecular intermixture than heretofore, and thus considerably aids ignition, and at the same time effects great economy in the consumption of petroleum. The air serving for the explosive mixtures is also heated by passing over the condenser, whereby a proportion of the heat which would otherwise be lost is utilized.

Having now particularly described and ascertained the nature of my said invention and in what manner the same is to be performed I declare that what I claim is—

In a petroleum-engine, the combination of a cylinder having a jacket in which the petroleum is vaporized with a valve-box for regulating the pressure in this jacket, and a condenser serving to condense the excess of vapor generated, and at the same time to heat the air which feeds the explosive mixture of the motor, substantially as described.

ALPHONSE EDOUARD TAVERNIER.

Witnesses:
JOHN E. BONSFIELD,
*Of the firm of G. F. Redfern & Co., 4 South Street, Finsbury, London, England, Patent Agents.*
W. C. BROKENSHIRE.